No. 856,989. PATENTED JUNE 11, 1907.
J. A. SCHULTZ, Jr.
PRESSURE REGULATOR.
APPLICATION FILED OCT. 3, 1906.
4 SHEETS—SHEET 1.
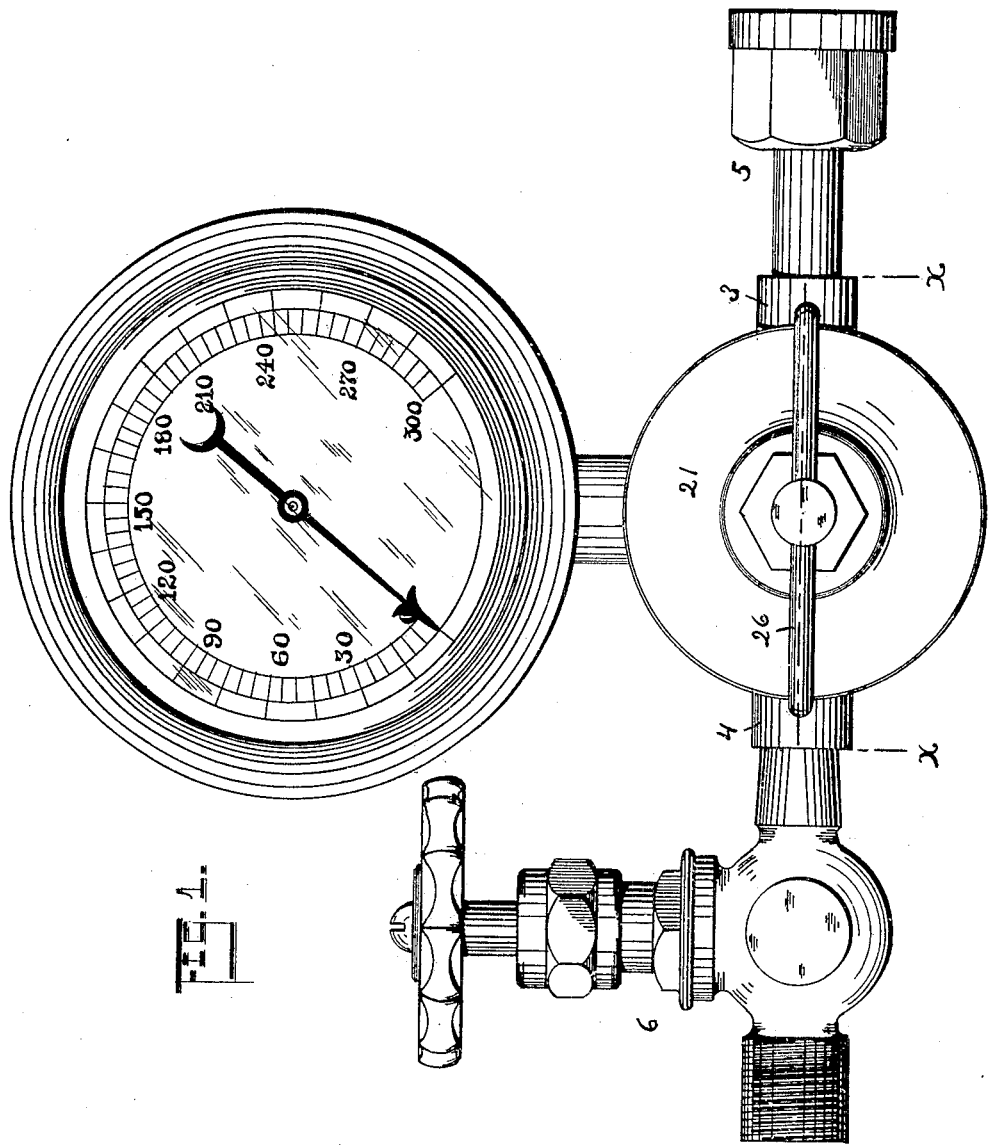
WITNESSES
Frederick Germann Jr.
Ethel B. Reed
INVENTOR
JOHN A. SCHULTZ Jr.,
BY
Russell M. Everett,
ATTORNEY.

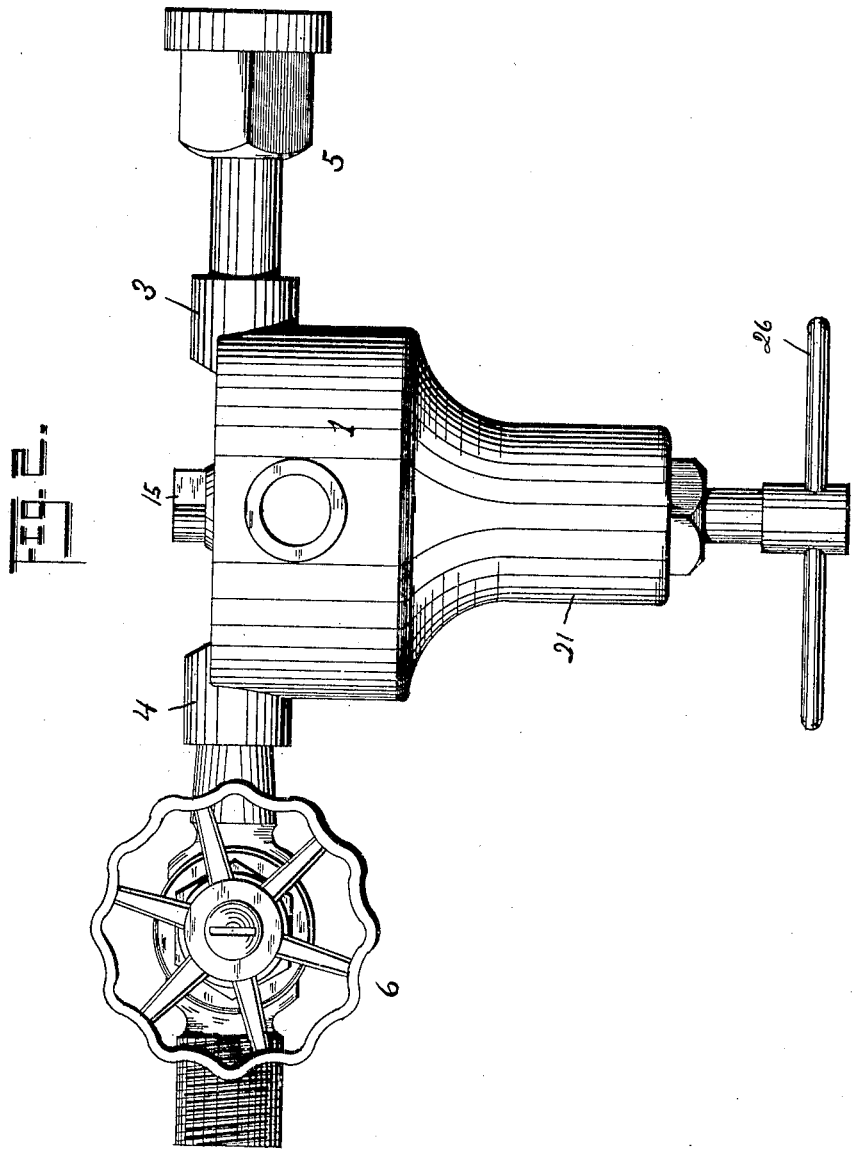

No. 856,989. PATENTED JUNE 11, 1907.
J. A. SCHULTZ, Jr.
PRESSURE REGULATOR.
APPLICATION FILED OCT. 3, 1906.
4 SHEETS—SHEET 3.
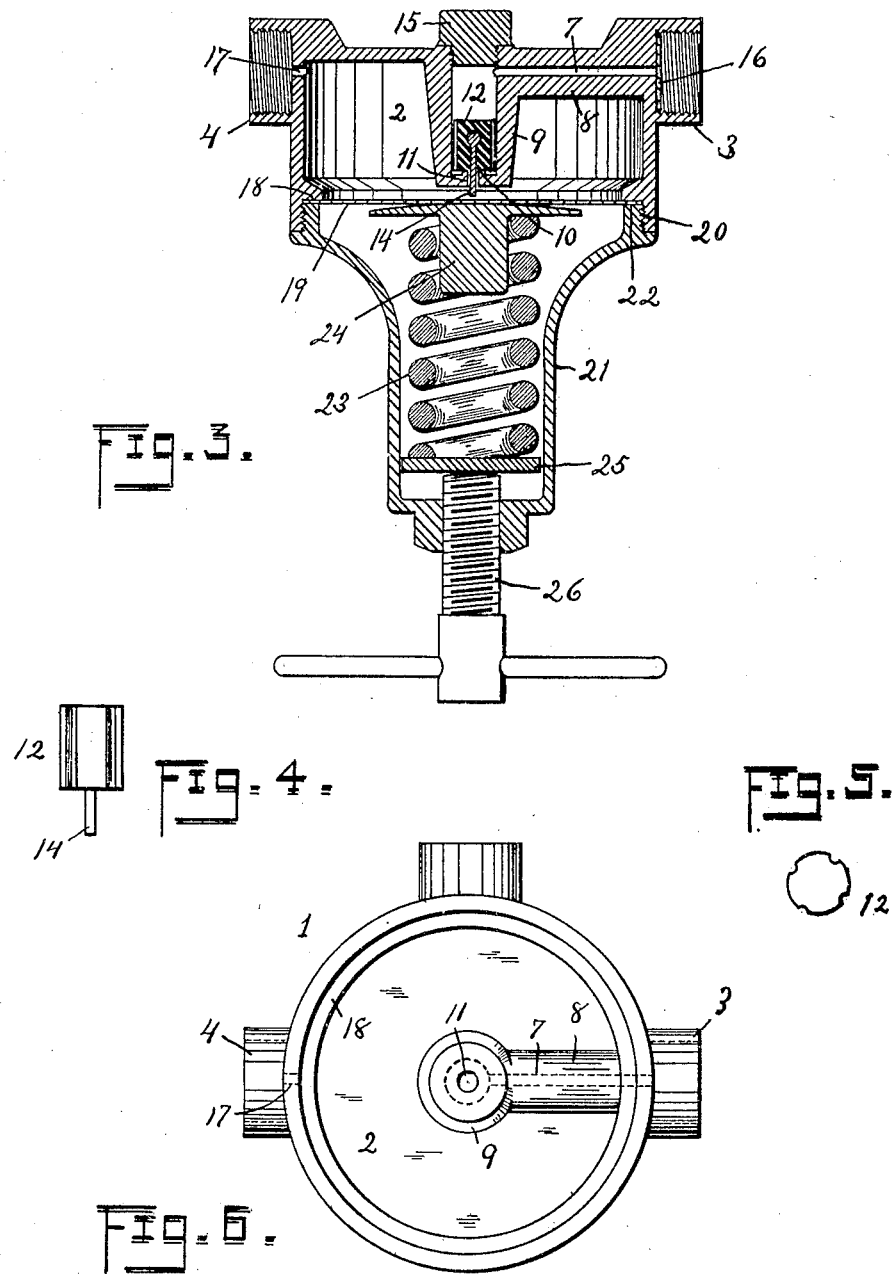

No. 856,989. PATENTED JUNE 11, 1907.
J. A. SCHULTZ, JR.
PRESSURE REGULATOR.
APPLICATION FILED OCT. 3, 1906.

4 SHEETS—SHEET 4.

WITNESSES  
INVENTOR  
JOHN A. SCHULTZ JR.  
BY  
ATTORNEY.

UNITED STATES PATENT OFFICE.

JOHN A. SCHULTZ, JR., OF NEWARK, NEW JERSEY.

PRESSURE-REGULATOR.

No. 856,989.　　　Specification of Letters Patent.　　　Patented June 11, 1907.

Application filed October 3, 1906. Serial No. 337,309.

*To all whom it may concern:*

Be it known that I, JOHN A. SCHULTZ, Jr., a citizen of the United States, residing at Newark, in the county of Essex and State of New Jersey, have invented certain new and useful Improvements in Pressure-Regulators, of which the following is a specification.

This invention relates particularly to that class of regulators which are employed in connection with tanks of compressed gas for reducing the pressure coming therefrom to a uniform strength and maintaining it thereat, as will be readily understood by those familiar with the art. Obviously, however, the regulator can be employed in other places and under other conditions to reduce or regulate any liquid or gaseous pressure as desired.

The objects of the invention are to secure in a pressure regulator, a controlling valve which acts with the flow of gas or fluid from its supply and not against the same; to enable the said valve when seated to be held seated by the supply pressure, thus avoiding any tendency of said supply pressure to unseat the valve or create a leakage; to provide such a valve which shall at the same time be governed by an elastic diaphragm, and to facilitate the convenient removal of said diaphragm; to secure a simple and durable construction, not liable to get out of order; to enable the valve parts to be replaced without the aid of a skilled mechanic; and to secure other advantages and results as may be brought out in the following description.

Figure 7:
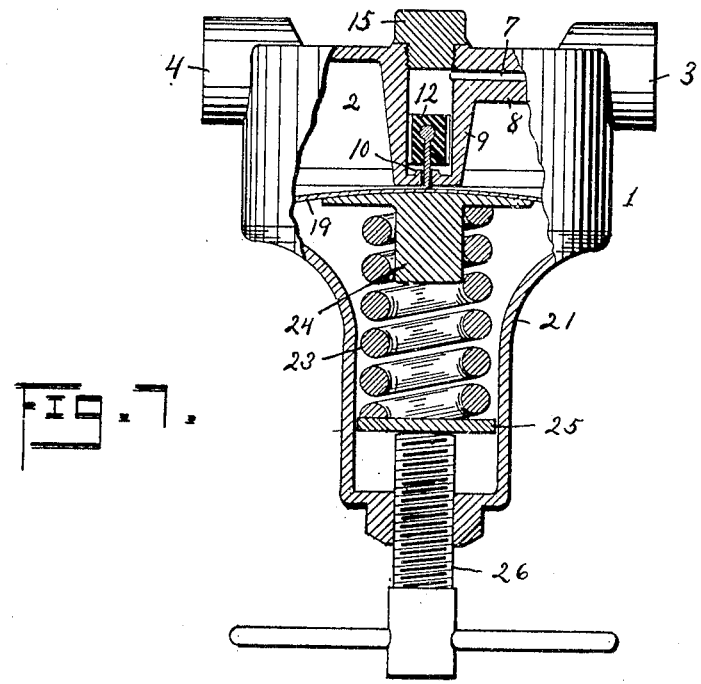
Figures 8, 9:
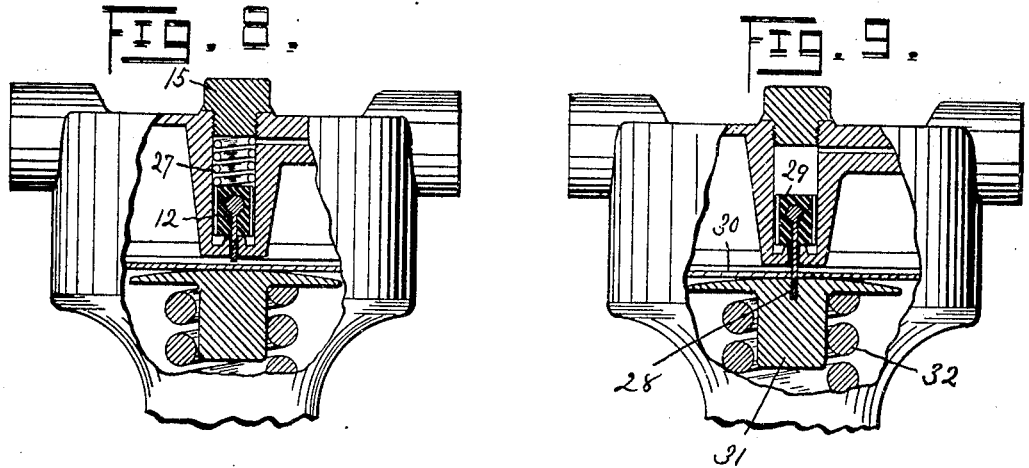

Referring to the accompanying drawings, in which like numerals of reference indicate corresponding parts in each of the several figures, Figure 1 is a front elevation of a pressure regulator of my improved construction, and Fig. 2 is a plan of the same with the gage removed; Fig. 3 is a longitudinal central section of the regulator taken on line *x*—*x*, Fig. 1; Fig. 4 is a detail side view of the controlling valve, and Fig. 5 an end view of the same; Fig. 6 is a view of the regulator casing with the diaphragm and its related parts removed to show the interior chamber; Fig. 7 is a view similar to Fig. 3 but showing the diaphragm under sufficient tension to unseat the controlling valve; Fig. 8 illustrates the use of a spring to aid in seating the controlling valve, and Fig. 9 shows the controlling valve connected by means of its stem to the diaphragm.

In said drawings, 1 indicates the body portion of my improved regulator, providing an interior chamber 2, which is shown of cylindrical shape although it might be otherwise if preferred. At opposite points of the said body portion 1, adjacent to its rear end, are sockets 3, 4, which receive, respectively, a coupling means 5 for supplying gas to the regulator, and a valve 6 by means of which the outlet of gas from the regulator is controlled.

A gas inlet passage 7 leads from the socket 3 through a raised portion 8 on the floor of the chamber 2, and opens into the base of a hollow post 9 centrally disposed in the chamber 2 of the casing. The end of the post 9 provides an inwardly facing valve seat 10, which is centrally perforated as at 11 and preferably has a raised annular rib around said perforation. A valve 12 is then slidably arranged in the interior of the post 9 to engage the said valve seat, being grooved or fluted at its sides, as at 13, to permit the flow of gas, and having a stem 14 projecting through the perforation 11. The rear end of the casing 1 has a removable screw-plug 15 in alinement with the hollow center of the post 9 to provide access thereto. Preferably a strainer 16 is arranged at the gas inlet or bottom of the socket 3, and a perforation 17 connects the socket 4 with the chamber 2.

It will be understood that by the construction above described, the gas pressure entering through the inlet 7 and the post 9, will seat the valve 12 by its own pressure, and so prevent further passage into the chamber 2. To provide means for counteracting this tendency up to a certain given pressure, or to secure regulation, I have provided the construction next to be described.

Within the chamber 2, the casing 1 provides an annular seat 18 to receive a flexible diaphragm 19 and hold the same when in flat position, as shown in Fig. 3, at a little distance from the stem 14 of the valve 12, which stem projects sufficiently beyond the end of the post 9 to permit free action of the diaphragm in opening the said valve. At the same time undue strain upon the diaphragm 19, such as would tend to break or injure the same, is prevented by said diaphragm engaging the top of the said post 9, as it is pressed inwardly with respect to the chamber 2.

Outside of the diaphragm seat 18, the casing 2 is interiorly threaded, as at 20, and receives a cap 21, the inner end edges of which, as at 22, clamp the diaphragm firmly upon its eat. The said cap is centrally and outwardly elongated to receive a heavy spring 23 carrying at its inner end a shoe 24 adapted to bear against the diaphragm 19, and having at its outer end a follower-plate 25 engaged by a screw 26 working in the end of the cap 21. By tightening said screw therefore, the diaphragm is forced inward to displace the valve 12 and permit a flow of gas until its pressure is sufficient to counteract the bulging of the diaphragm and return it to its original position, as will be understood.

Under some conditions I may, if desired, employ a light spiral spring 27 between the valve 12 and screw-plug 15, as shown in Fig. 8, and which will effect a more positive seating of the valve. Or, again, the stem 28 of the valve 29, as shown in Fig. 9, may be elongated and threaded to effect a connection of the valve to the diaphragm 30, as by passing through said diaphragm and screwing into the shoe 31 of the regulating spring 32.

Other modifications and changes in the detail construction of my invention might perhaps be made without departing from the spirit and scope of the invention, by those skilled in the art, and I do not wish to be understood as limiting myself by positive descriptive terms herein employed except as the state of the art may require.

Having thus described my invention, what I claim as new is:

1. In a pressure regulator, a body portion providing an interior chamber, a fluid inlet projecting into said chamber and providing an interior valve seat and adjacent slide-way, a valve in said slideway adapted to be forced toward said seat by the pressure of the fluid, a stem upon said valve adapted to project from the inlet, and a spring-controlled diaphragm adapted to engage said valve stem and the end of said inlet.

2. In a pressure regulator, a body portion providing an interior chamber, a fluid inlet terminating in a hollow post centrally disposed in said chamber, said post being perforated at the end and having thereat an interior valve seat, a valve slidably arranged in said hollow post, a stem projecting from said valve through the end of the post, a diaphragm adapted to engage said stem and the end of the post, and adjusting means for said diaphragm.

3. In a pressure regulator, a body portion providing an interior chamber, a fluid inlet projecting into said chamber and providing an interior valve seat and adjacent slideway, a valve in said slideway adapted to be forced toward said seat by the pressure of the fluid, and means engaging said valve to positively seat the same.

4. In a pressure regulator, a body portion providing an interior chamber, a fluid inlet projecting into said chamber and providing an interior valve seat and adjacent slideway, a valve in said slideway adapted to be forced toward said seat by the pressure of the fluid, a stem upon said valve adapted to project from the inlet, and a spring-controlled diaphragm adjacent to said inlet and connected to the said stem.

JOHN A. SCHULTZ, Jr.

In the presence of—
 CHAS. H. F. BLÜMELING,
 RUSSELL M. EVERETT.